(12) United States Patent
Tünkers

(10) Patent No.: US 8,967,034 B2
(45) Date of Patent: Mar. 3, 2015

(54) APPARATUS DRIVEN BY COMPRESSED AIR AND EQUIPPED WITH DUAL PISTON FUNCTION FOR USE IN BODY CONSTRUCTION IN THE AUTOMOTIVE INDUSTRY

(75) Inventor: Josef-Gerhard Tünkers, Ratingen (DE)

(73) Assignee: Tunkers Maschinenbau GmbH, Ratingen (DE)

( * ) Notice: Subject to any disclaimer, the term of this patent is extended or adjusted under 35 U.S.C. 154(b) by 1002 days.

(21) Appl. No.: 13/062,311

(22) PCT Filed: Dec. 18, 2009

(86) PCT No.: PCT/EP2009/009106
§ 371 (c)(1),
(2), (4) Date: Mar. 4, 2011

(87) PCT Pub. No.: WO2010/127690
PCT Pub. Date: Nov. 11, 2010

(65) Prior Publication Data
US 2011/0162522 A1    Jul. 7, 2011

(51) Int. Cl.
| F15B 11/028 | (2006.01) |
| F15B 11/032 | (2006.01) |
| B25B 5/12 | (2006.01) |
| B25B 5/16 | (2006.01) |
| F15B 15/24 | (2006.01) |

(52) U.S. Cl.
CPC ............. *F15B 11/0325* (2013.01); *B25B 5/122* (2013.01); *B25B 5/16* (2013.01); *F15B 15/24* (2013.01)
USPC .................................. 91/395; 91/392; 269/32

(58) Field of Classification Search
USPC ................................ 91/392, 395; 269/32, 228
See application file for complete search history.

(56) References Cited

U.S. PATENT DOCUMENTS

| 6,065,743 | A | 5/2000 | Roudier et al. |
| 6,220,588 | B1 | 4/2001 | Tunkers |
| 6,612,557 | B2 * | 9/2003 | Sawdon et al. ................. 269/32 |
| 6,616,133 | B1 | 9/2003 | Wheeler et al. |

(Continued)

FOREIGN PATENT DOCUMENTS

| DE | 198 24 579 C1 | 6/1999 |
| DE | 101 36 057 C1 | 10/2002 |
| DE | 698 10 413 T2 | 11/2003 |

(Continued)

*Primary Examiner* — Thomas E Lazo
(74) *Attorney, Agent, or Firm* — Antonelli, Terry, Stout & Kraus, LLP.

(57) ABSTRACT

The invention relates to an energy-efficient apparatus driven by compressed air and equipped with a dual piston function for tensioning, or clamping, or centering, or punching, or welding, or clinching, for use in body construction in the automotive industry. The apparatus is driven by a pressurized fluid, in particular by compressed air. It is shown how a significant amount of operating costs can be saved while, at the same time, conserving the environment and consuming a low amount of pressurized fluid, in particular compressed air. In addition, the pivoting angle of a toggle joint assembly and thus of an apparatus connected thereto, for example, a tensioning arm of a toggle tensioning apparatus, can be continuously adjusted in both directions while, at the same time, adjusting a sampling device using sensors, for example, microswitches, or inductive switches, or pneumatic switches, or limit switches.

23 Claims, 3 Drawing Sheets

(56) References Cited

U.S. PATENT DOCUMENTS

Figure 1:
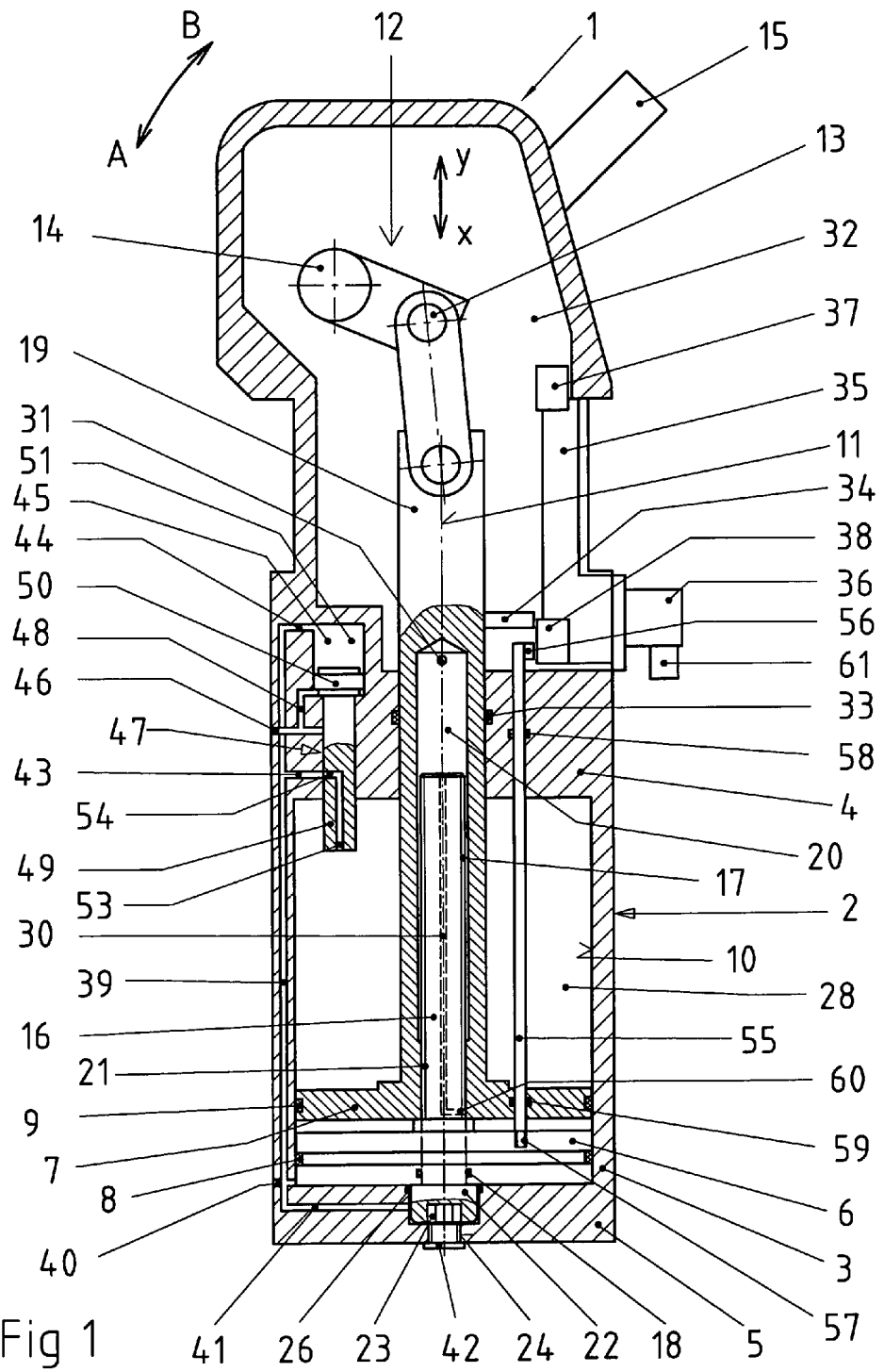

2002/0158394 A1   10/2002   Sawdon et al.
2009/0000468 A1 *  1/2009   Tunkers ............................ 92/86

FOREIGN PATENT DOCUMENTS

| DE | 10 2006 041 707 A1 | 11/2007 |
| DE | 102006041707 A1 * | 11/2007 |
| DE | 10 2008 007 256 B3 | 8/2009 |
| EP | 0 908 272 B1 | 4/1999 |
| EP | 1 262 285 A2 | 12/2002 |
| WO | WO 2005/044517 A2 | 5/2005 |
| WO | WO 2005044517 A2 * | 5/2005 |
| WO | WO 2007/128437 A1 | 11/2007 |

\* cited by examiner

APPARATUS DRIVEN BY COMPRESSED AIR AND EQUIPPED WITH DUAL PISTON FUNCTION FOR USE IN BODY CONSTRUCTION IN THE AUTOMOTIVE INDUSTRY

The invention relates to an energy-efficient apparatus driven by compressed air and equipped with dual piston function for tensioning, and/or clamping, and/or centering, or punching, or welding, or clinching, for use in body construction in the automotive industry, comprising a drive unit configured as piston-cylinder unit to which the compressed air can be supplied and a head unit coaxially adjacent thereto, also called tensioning head, in which a toggle joint assembly is arranged in a pivotably movable manner on a stationary axle mounted in the head unit.

PRIOR ART

Toggle joint assemblies of the aforementioned type are known in numerous different constructions.

DE 198 24 579 C1 of the applicant describes such a toggle lever tensioning device with the specific feature that two pistons are arranged in a drive unit which are adjustable relative to each other and sealed with respect to the cylinder, but are formed such that they can be adjusted relative to each other with respect to their stroke by access from the bottom cover side and by means of a tool. This takes place, for example, in that a screw can be turned by means of a tool in both directions through an opening in the bottom cover in order to adjust the stroke of the bottom-side adjusting piston which results in an adjustment of the annular piston with which the piston rod is associated. Thereby, also the pivoting angle of a tensioning arm is indirectly changed.

EP 1 262 285 A2 and U.S. Pat. No. 6,612,557 B2 show a similar construction.

DE 298 11 331 U1 illustrates a toggle lever tensioning apparatus with a piston rod which is formed in two parts. The one piston rod part is connected via a coupling element to the toggle joint assembly and is formed as screw which can be screwed more or less far into a threaded blind borehole of the second piston rod. Said second piston rod part is integrally connected to a piston which is longitudinally movable and sealingly guided in a cylinder and thereby transmits the axial adjusting force of the piston via the piston rod to the toggle joint and thus to the tensioning arm. Depending on the length of thread engagement of the two piston rod parts, the pivoting angle of the tensioning arm changes. Inductive position sensors are also present, wherein one position sensor is associated with the piston rod part associated with the toggle joint of the toggle joint assembly and the other position sensor formed as flag is associated with the piston rod part provided with the internal thread. A similar illustration is described in DE 698 10 413 T2, in U.S. Pat. No. 6,065,743, and in EP 0908 272 B1. U.S. Pat. No. 6,220,588 B1 also shows such an axial adjustment of an adjusting piston, whereas U.S. Pat. No. 6,616,133 B1 relates to a stepwise adjustment of the piston rod.

WO 2005/044517 A2 shows also a toggle joint device of the applicant, comprising a dual piston in the piston-cylinder unit, wherein the adjusting piston can be continuously adjusted relative to the annular piston via a screw, namely from the bottom cover side by means of a tool inserted through an opening.

Longitudinally adjustable piston rod parts which can be adjusted from the outside through a bottom cover are also illustrated and described in U.S. Pat. No. 6,612,557 B2 and EP 1 262 285 A2 and also in DE 101 36 057 C1.

The disadvantage when driving such devices, in particular toggle joint clamping devices, provided with toggle joints is that during the no-load stroke (idle stroke), a large portion of the compressed air is not needed at all to carry out the work but serves only to overcome the usual friction forces while the air volume of the opposing annular space is vented.

For this reason, DE 10 2006 041 707 B4 has already proposed a solution by means of which the energy consumption can be significantly reduced, for example by 40%, if during the no-load stroke (idle stroke) the actual adjusting cylinder and thus the piston rod, the toggle joint assembly and the device part, for example, a tensioning arm connected thereto is driven only with a significantly lower force. Only upon reversing, that is, in working position, the entire compressed air acts on the adjusting piston and exerts the full force. During the idle stroke, the compressed air on the piston ring side is directed onto the pressure-operating area, thus into the cylinder space for the adjusting piston, so that said compressed air does not get lost but its energy remains utilizable for driving the adjusting piston and the piston rod. Thereby, the operating costs are reduced.

This idea is also pursued in DE 10 2008 007 256 B3 of the applicant, namely to save as much energy as possible when driving devices, in particular toggle lever tensioning apparatuses, provided with such toggle joints. It must not be ignored here that, for example, toggle lever tensioning apparatuses or the like are used in high numbers in the manufacturing lines during the production of bodies in the automotive industry so that normally large amounts of compressed air are used which are not used at all during the no-load stroke. Only directly after the start of the force stroke, that is, when the apparatus works, for example, when the tensioning arm has to clamp device parts, which is the case shortly before the end of the total stroke, the device is pressurized with the full pressure of the pressure medium. Upon or shortly before begin of the full pressure deployment of the piston, the small amount of compressed air in the annular space is vented. A similar situation applies also to WO 2007/128437 A1.

OBJECT

The invention is based on the object to inventively configure an apparatus according to the aforementioned type, for example driven by compressed air, for tensioning, and/or clamping, and/or centering, and/or punching, and/or welding, and/or clinching, for use in body construction in the automotive industry in such a manner that not only the adjusting stroke of the piston-cylinder unit can be changed in a simple manner from the outside by means of a simple tool and without disassembling the apparatus, but also a significant amount of drive energy can be saved to reduce the operating costs and thus the energy costs.

SOME ADVANTAGES

In a first solution according to FIG. 1, the piston-cylinder unit is associated with a dual piston, wherein the one piston is formed as annular piston and the other one as adjusting piston. The annular piston is connected to a piston rod part which is drivingly coupled to the toggle joint assembly to thereby transfer the axial adjusting movements into a pivoting movement on the apparatus part, for example, a clamping lever, associated with the toggle joint assembly. The annular piston controls a control device, while the second piston rod part, which is formed, for example, as a screw, can be turned in the one or the other direction via the adjusting piston and by means of a tool, for example an allen key, through an opening in the bottom cover of the cylinder. Thereby, the effective adjusting stroke of the annular piston and the adjusting piston is changed which indirectly results also in a change of the pivoting angle of the toggle joint assembly and the apparatus part coupled thereto. Thus, it is possible to change, for example, the pivoting angle of a tensioning arm from the outside.

This useful and easy adaptation of the pivoting angle by adjusting the axial length of the actual multi-part piston rod is supplemented in an inventive manner by a control device. Until the point in time in which the annular piston does not reverse said control device, which takes place only shortly before the end of the stroke, only a relatively small amount of fluid is needed to fill the cylinder space of the adjusting piston because during the stroke, the annular piston directs the amount of fluid displaced by the annular piston via a channel system to the pressure-effective space of the adjusting piston so that said amount of fluid does not get lost. During the idle stroke, only the amount of compressed air determined by the volume of the piston rod has to be supplied to carry out the idle stroke. For this, a relatively small amount of energy is necessary because only the relatively small frictional forces and —depending on the mounting position—also gravitational forces have to be overcome by installed apparatus parts. Clamping work or other work is not yet required to be carried out during the idle stroke (no-load stroke). Only when the control device is reversed by annular piston, which can take place shortly before the end of the idle stroke, the small amount of compressed air in the annular space is vented. At the same time, the full pressure of the compressed air acts on the pressure-effective piston area of the adjusting piston and thereby generates the high working force which is required, for example, for clamping, clinching, welding or the like.

Overall, this results in a noticeable saving in operating costs which saving, depending on the size of the respective apparatus and the piston stroke, for example in case of toggle lever tensioning apparatuses, can be approximately 66 percent. Considering that in manufacturing lines hundreds of such apparatuses, for example, toggle lever tensioning apparatuses are used, the savings in energy costs and thus operating costs are significant.

Thus, the invention provides an apparatus comprising a toggle joint assembly by means of which, besides a simple adjustment of the pivoting angle, for example of a tensioning arm, from the outside and without disassembly of the apparatus, in addition, operating costs are saved due to the reduced consumption.

In the second solution of the same problem, a sampling device in the form of a set comprising microswitches, limit switches, or pneumatic switches, or inductive switches is provided which also allows to continuously change the pivoting angle in a simple manner from the outside while economically driving the apparatus, but, at the same time, by changing the pivoting angle of the toggle joint assembly and thus, for example, of a tensioning arm, the actuating position of the sampling device can be adjusted. This takes place with the same movement, namely the rotational movement towards a piston rod part so that after changing the pivoting angle of the toggle joint assembly, time-consuming adjustment or setting work on the sensor device is no longer required.

Further Inventive Configurations

A very advantageous embodiment is one in which no external hose lines are present because the respective reversing channels and feeding channels are in the walls of the apparatus itself. Said channels can be arranged, for example, in the bottom cover or in the wall between the head part and the actual cylinder or in the cylinder walls themselves. Thereby, said channels are protected from the outside against damage and contamination and, moreover, do not change the overall dimension of the apparatus, for example, of toggle lever tensioning apparatuses.

It is particularly advantageous if the control piston is arranged in a wall which separates the pressure-effective cylinder space of the annular piston from the inner space of the head part, for example, from a tensioning head of a toggle lever tensioning apparatus. This makes it possible that the idle stroke of the annular piston can be utilized to a rather large extent before the idle stroke actuates the control device, in particular, the control piston and reverses the same so that at the same time, the full pressure of the pressure medium, in particular air pressure, acts on the pressure-effective piston area of the adjusting piston and then, for example, generates the tensioning force for the tensioning lever of a toggle lever tensioning apparatus.

The adjusting piston maybe connected to an actuating part which has a switching flag at its end. This results in the advantage that during the stroke adjustment of the adjusting piston, the switching flag is also adjusted at the same time via the actuating part so that the sensor device is adjusted at the same time to the new stroke.

The actuating part can be formed as rod which penetrates in a sealed manner the annular piston and the wall which separates the inner space of the head part from the cylinder of the drive unit. This results in a compact construction. These parts are not visible from outside because they are arranged and protected in the interior.

The sensor device is preferably formed as cartridge which is arranged through an opening at the backside of the head part, for example, a tensioning head. The apparatus itself can be equipped on all four sides with suitable blind holes provided with threads so that the apparatus, if necessary, can be fastened on all four sides, even on the backside of the apparatus itself, which is of particular advantage for the production of bodies in the automotive industry.

A particularly advantageous embodiment with this construction may allow a secure change of the pivoting angle of the toggle joint assembly to be achieved. Thereby, for example, when adjusting welding electrodes, not only the feed travel can be changed in a sensitive manner, but it can also be accurately determined after which stroke of the dual piston-cylinder unit the full pressing force during welding is to be applied to the parts to be spot-welded together. The same applies for clinching or, for example, tensioning by means of a toggle lever tensioning apparatus.

In some embodiments the piston rod connected to the toggle joint assembly may have a first part connected to the annular piston and a blind bore hole provided with an internal thread. A second piston rod part connected to the adjusting piston may comprise corresponding external threads as to allow the adjustment of the cylinder space between the annular piston and the adjusting piston from the outside through the bottom cover of the drive unit. So adjusting the cylinder space between the annular piston and the adjusting piston provides a means of changing the effective adjusting stroke of the annular piston and the adjusting piston and the adjusting piston. Adjusting the cylinder space between the annular piston and the adjusting piston also provides a means of changing the pivoting angle of the toggle joint assembly and the tensioning are attached thereto.

In other embodiments, the second piston rod part connected to the adjusting piston may comprise a blind bore hole having an internal and the first piston rod part connected to the annular piston may comprise a corresponding external thread. Accordingly the first piston rod part may be formed as a threaded bolt. In such embodiments, engagement of the first piston rod part with the second piston rod part may be adjusted through the botoom cover of the drive unit.

An advantageous embodiment may comprise a brake piston associated with the adjusting piston at the side of the adjusting piston facing towards the bottom. In the open position, the brake piston may engage in a sealed manner with a brake chamber in the bottom cover of the cylinder.

An opening, which can also be closed, may be arranged in the bottom of the piston-cylinder unit, through which opening a suitable tool, for example, an allen key, can be inserted which engages with a corresponding recess of the brake piston in order to rotate the associated piston rod part in the one or the other direction.

The cylinder space between the annular piston and the adjusting piston may be connected via a borehole provided in the piston rod and a channel running through the piston rod or the piston rod parts to the inner space of the head part and thus is virtually vented to the outer atmosphere because said inner space is not sealed in a fluid-tight manner.

The cylinder space facing the pressure-effective side of the adjusting piston is connected via a throttle borehole to a feeding channel for the fluid, for example, compressed air. Said feeding channel, for its part, is connected to the channel system which also runs to the annular side of the annular piston and, at the same time, is in fluid communication with the brake chamber. Subsequent to the brake piston plunging into the brake chamber and moving over a seal of the cylinder space which is associated with the pressure-effective side of the adjusting piston, said brake chamber is being closed.

In some embodiments, the pressure-effective side of the adjusting piston may be connected via a throttle channel to a fluid supply, a fluid discharge and via a channel system to the pressure effective side of the annular piston. The same channel system and throttle channel may also connect the pressure-effective side of the adjusting piston to a brake chamber in the bottom cover.

The inner space of the cylinder of the piston-cylinder unit as well as the outer boundary of the adjusting piston and the annular piston can be formed noncircular, for example, flat-oval. Flat-oval is to be understood as shapes with the longer sides being sides of a rectangle and the narrow sides being connected to each other by circular arcs or curves. Thereby, the annular piston and also the adjusting piston are arranged in the cylinder in a non-rotatable manner.

The piston rod which is associated with the adjusting piston is connected in a positive or non-positive manner with respect to the latter. This connection can be unlocked or released or overcome by means of a tool which is inserted through a borehole in the bottom cover for the purpose of an axial adjustment of the piston rod parts. This type of interlock or coupling between piston rod part and adjusting piston can be carried out by means of a latch, at least one pin, balls, or by a seal, for example, a ring seal with an adequate pre-load, or by a locking mechanism which can be unlocked from the outside by a tool.

Figure 2:
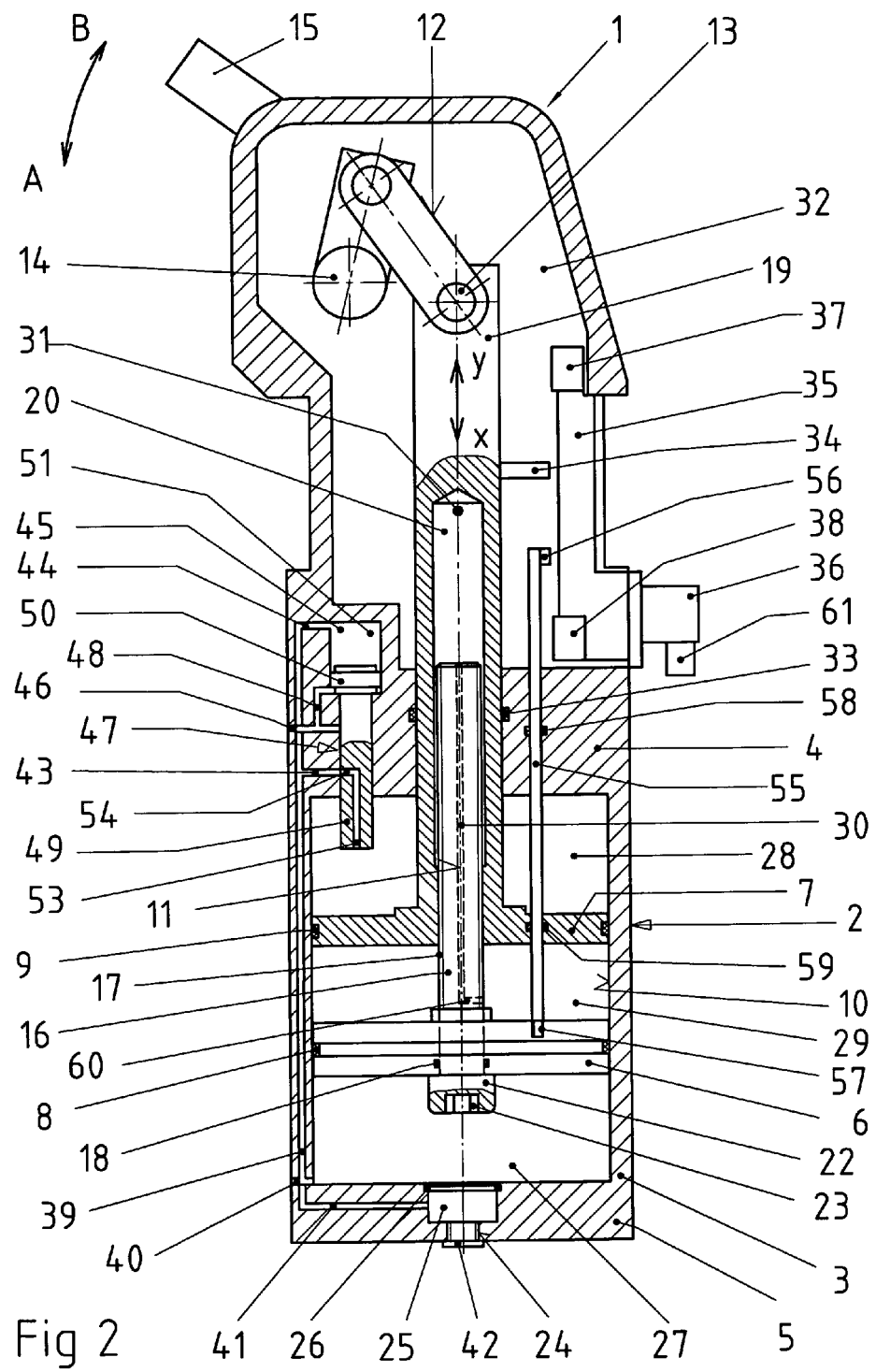
Figure 3:
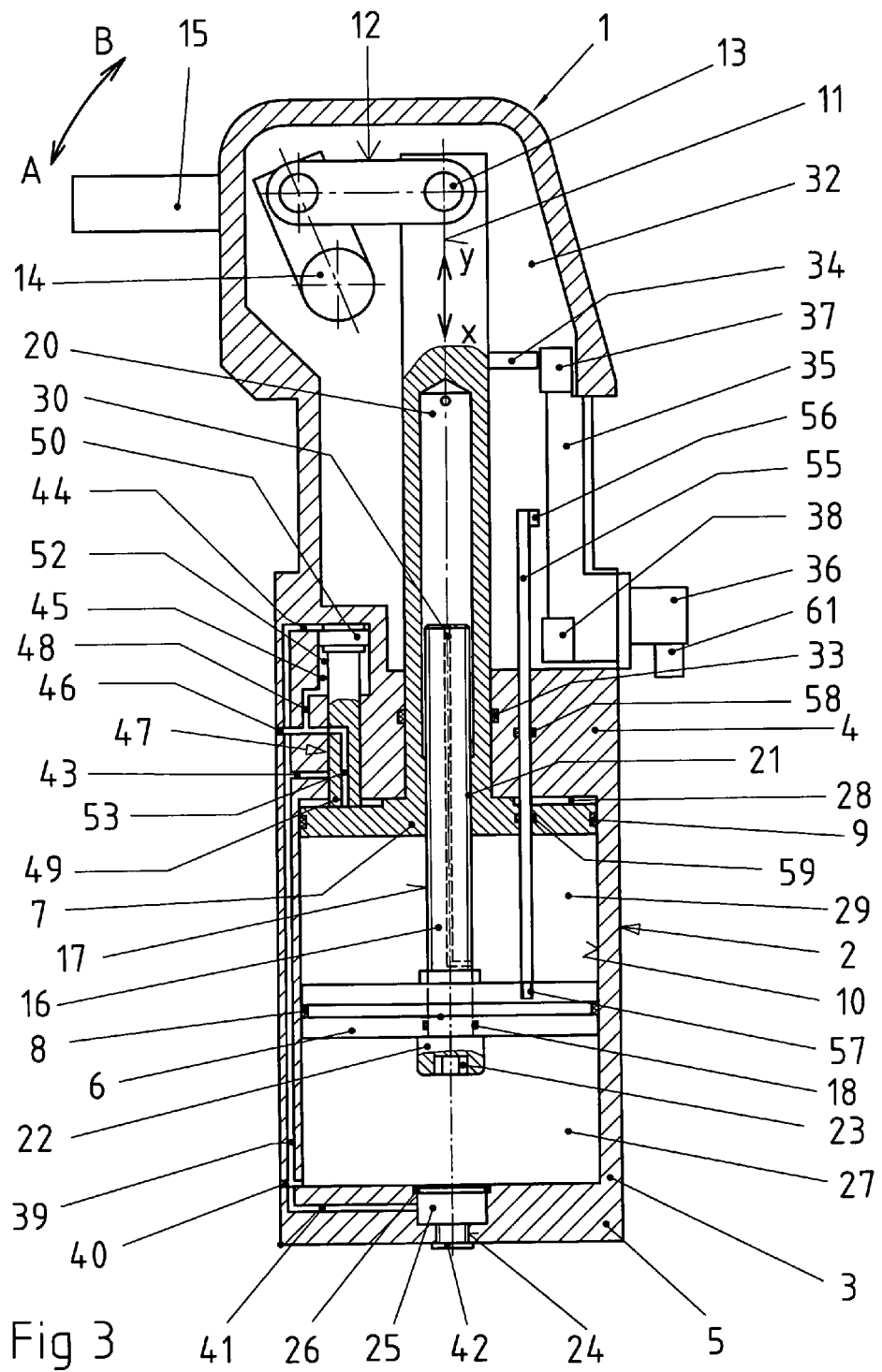

The invention is exemplary illustrated—partly schematically—in the drawing. In the figures:

FIG. 1 shows an apparatus according to the invention formed as toggle lever tensioning apparatus in a schematic longitudinal section in the open position, wherein the annular piston and also the adjusting piston are in an end position in the region of the bottom cover and are screwed into each other virtually to the maximum depth;

FIG. 2 shows an intermediate position of the parts in which the adjusting piston and the annular piston are approximately in a central stroke region and the piston rod parts are partially screwed into each other, and FIG. 3 shows a tensioning position of a toggle lever tensioning apparatus in which the piston rod parts are partially screwed apart from each and the control device formed as control piston has just switched over by a longitudinal displacement.

In the drawing, the invention is illustrated using a toggle lever tensioning apparatus which is used with particular advantage in the body construction in the automotive industry. Generally, the reference number 1 designates a head unit formed as tensioning head to which a drive unit 2 formed as piston-cylinder unit is connected. In the drawing, the tensioning head 1 and the drive unit 2 are illustrated as one piece with respect to the material; however, they can also form separate structural units and can be connected to each other, for example, by screws (not illustrated). The head unit 1 as well as the drive unit 2, in particular their cylinders 3, can be made of light metal, in particular of an aluminum alloy. The drive unit 2 is illustrated separated by a wall 4 from the head unit 1. Said wall 4 can be formed as cover which, instead of being connected as one piece with respect to the material—as illustrated in the drawing—can be connected by means of screws or the like (not illustrated) to the cylinder and/or the head unit 1 as one piece with respect to the function. The cylinder's 3 bottom facing away from the head unit is formed by a bottom cover 5 which is illustrated in the closed state and which is illustrated in the drawing as one piece with respect to the material, and which, if necessary, can be connected by screws or the like in a fluid-tight manner, in particular pressure-medium-tight manner, to the cylinder 3, in the same manner as the wall 4 is connected to the cylinder 3. Adequate seals are not illustrated. The cylinder 3 can be formed circularly, thus cylindrically, at least in the inside, preferably also on the outside; however, it is also possible to provide the cylinder with a shape that differs therefrom, for example, a shape which has a rectangular cross-section on the inside and on the outside, or a so-called flat-oval or elliptical shape. This can involve, for example, cross-sectional shapes, the rectangle sides of which are formed by circular arcs or straight lines on the inside and on the outside, while the narrow sides of the rectangle are represented by circular arcs or curve sections. In this manner, a small transversal dimension is obtained so that such apparatuses can be arranged particularly close to each other in manufacturing lines in order to be able to position, for example, spot welds or clamping arms close to each other.

In the cylinder 3, two pistons are arranged at an axial distance to each other, wherein the one piston which faces the bottom cover 5 is formed as adjusting piston 6 and the other piston which faces the head unit 1 is formed as annular piston 7. The adjusting piston 6 as well as the annular piston 7 is formed so as to be sealed with respect to an inner wall 10 of the cylinder in a fluid-tight manner, in particular, compressed air-tight manner by sealing elements 8 and 9. Depending on the pressure of the pressure medium, the adjusting piston 6 and the annular piston 7 are moved in the same direction and together towards the common center line 11, thus moved coaxially either in the direction X or the direction Y.

As is shown in the drawing, a piston rod which transmits the stroke movements in the X- or Y-direction of the adjusting piston 6 on the one hand, and the annular piston 7 on the other, by means of a joint 13 onto a toggle joint assembly 12, is formed in two pieces. Here, the joint 13 is formed as pivot joint which transmits its movements via guide elements of the toggle joint assembly 12 onto an axle 14 which is fixedly arranged in the housing and to which a drivingly movable apparatus part, e.g., a tensioning arm 15 is coupled which, depending on the movement of the toggle joint assembly 12, is pivoted in the direction A or B. Instead of a tensioning arm 15, welding jaws, or a clamping mandrel, or a clinching tool can also be attached here. An abutment, also called jaw, that interacts, for example, with the tensioning arm 5 is not illustrated here for reasons of simplification. Between such an abutment and the tensioning arm 15, for example, fixture parts such as sheet metals or assemblies as they are used in particular in the body construction in the automotive production are retained and clamped until they are permanently connected to each other, for example, by spot welding or clinching or adhesive bonding.

In the illustrated embodiment, the one piston rod part 16 is non-positively connected to the adjusting piston 6 and has a thread 17 on its outer side, thus is formed in the manner of a screw spindle. The non-positive connection between said piston rod part 16 and the adjusting piston 6 is substantially formed by the non-positive or frictional connection between the surface of a section of the piston rod part 16 and a sealing element 18 associated with the adjusting piston 6, which sealing element can be formed, for example, as ring seal. However, instead of this, the connection can also be carried out in a positive manner, for example, in the manner of ball catches, by a positive interlock by means of a pin, by screws, bayonet lock, or the like.

The other piston rod part 19 is provided in the longitudinal direction with a blind hole 20 which has an internal thread 21 into which the piston rod part 16 can be screwed more or less far in the X- or Y-direction, thus in the axial direction. Thereby, the axial distance of the adjusting piston 6 from the annular piston 7 is changed accordingly, e.g., continuously.

The piston rod part 16 penetrates the adjusting piston 6 and, on its longitudinal section facing the bottom cover 5, is provided with a brake piston 22 which has an axial recess 23 for applying a suitable tool, for example, a polygonal wrench. In the bottom cover 5, a closable opening 24 is arranged through which a tool can be inserted into the recess 23 of the brake piston 22 in order to rotate the same and thus the piston rod part 16 in the one or the other direction about their common longitudinal axis and thereby to change the distance of the adjusting piston 6 from the annular piston 7. This results then in a corresponding stroke change in the X- or Y-direction and thus results also in a corresponding change of the pivoting angle of the toggle joint assembly 12 and the apparatus part associated therewith, for example, the tensioning arm 15, in the direction A or B.

The opening 24 opens out in a brake chamber 25 in the bottom cover 5 which brake chamber is associated with a sealing element which seals the brake chamber 25 when the brake piston 22 plunges into the latter. The sealing element 26 can be equipped in such a manner that the sealing element, when pressurized by pressure medium of the brake chamber 25, allows fluid, in particular compressed air, to flow into the adjusting cylinder space 27, but seals in the opposite direction. The other annular cylinder space associated with the annular piston 7 and to be pressurized by fluid pressure, in particular compressed air, is designated with the reference number 28. In contrast, cylinder space 29 is not pressurized in any position by fluid pressure, but is connected via a transverse channel 60 and a longitudinal channel 30 via a borehole 31 to the blind borehole 20 and is thereby permanently vented into the inner space 32 of the head part 1. Said head part 1 encapsulates the piston rod part 19 as well as toggle joint assembly 12 and the joints from outside against dirt and moisture. For this purpose, the head part 1 can consist of two housing parts, in particular housing halves, which lie on top of each other in a sandwich-like and sealed manner, and which are detachably connected to each other in a suitable manner, in particular by non-illustrated screws.

The piston rod part 19 penetrates through the wall 4 and is fluid-tight sealed by a sealing element 33 and is provided in the inner space 32 with a switching flag 34 which actuates a sensor device 35 which can be provided with suitable microswitches, inductive switches or the like. The microswitches or other sensor elements can either be fixed in the X- or Y-direction or they can be intermittently or continuously adjustable or can have actuatable elements over the entire length. The sensor device 35 is associated with a suitable electrical or electronic component 36 which transfers the values to a remote monitoring unit, for example, a computer which is connected to and arranged in the sequence controller for the fluid pressure application of the individual apparatuses (not illustrated). The sensor device 35 is arranged through a recess, in particular through a longitudinal slot on the backside of the apparatus and covers the slot as dust-tight and moisture-tight as possible. However, the sensor device can also be introduced into the inner space 32 through a suitable opening. Illustrated in the shown embodiment are two microswitches 37 and 38 which are spaced apart from each other and which can also be configured as inductive switches and via which the individual positions of the apparatus part, for example, a tensioning arm 15, can be detected, that is, if the same is, e.g., in open position or closed position (working position).

As is shown in the drawing, in the one cylinder wall there is a longitudinal channel 39 which is in fluid communication with a transverse channel 40 which, in turn, is connected to a channel which is arranged in the bottom cover 5 and which, if applicable via a throttle bore, is in fluid communication with the brake chamber 25. Viewed in the direction towards the bottom cover 5, the channel 41 opens out downstream of the sealing element 26 into the brake chamber 25 and is also connected to the fluid supply and fluid discharge which can take place via the transverse channel 40. Thus, the brake chamber serves for supplying and optionally for discharging fluid, e.g., compressed air. The brake chamber 25 itself is sealed in a fluid-tight manner with respect to the outside via a sealing plug 42. Once said sealing plug 42 is removed, the channels and thus also the adjusting cylinder space 27 are vented and the access to the recess 23 in the brake piston 22 by means of a tool is provided.

The longitudinal channel 39 opens out via the transverse channel 40 into the adjusting cylinder space 27. The transverse channel 40 is connected to a suitable fluid supply and discharge system (not illustrated). Said fluid can be hydraulic fluid, compressed air or a quasi-liquid as it is used for operating working cylinders. However, it is preferred in the body construction in the automotive industry to use compressed air because the same is available everywhere in the companies and in particular in manufacturing lines.

At a distance from its other end, the longitudinal channel 39 is in fluid communication with a deflection channel 43 arranged in the wall 4, while the longitudinal channel 39 is also in fluid communication at its end in a fluid-conducting manner with a channel section 44 which opens out in a fluid-conducting manner into a chamber 45. In the wall 4, a further channel 46 is arranged which opens out into a cylindrical borehole 47. Connected to said channel 46 is a chamber channel 48 which opens out a fluid-conducting manner with the borehole 47 and at the other end into the chamber 45. In the cylindrical borehole 47, a control device is arranged which in the present case comprises a piston slide valve 49 which is guided in a sealed and longitudinally movable manner in the cylindrical borehole 47 and which projects with a certain longitudinal section into the annular cylinder space 28 and which is guided with a piston 50 in the chamber 45 in a longitudinally movable and sealed manner. The sealing element for the piston 50 is not illustrated for reasons of simplification. Thereby, the chamber 45 is divided into two cylinder spaces 51 and 52, wherein the chamber channel 48 opens out in a fluid-conducting manner into the one cylinder space, while the channel section 44 opens out in fluid-conducting manner into the other, opposite cylinder space. The piston slide valve has a longitudinal channel 53 which, in the illustrated embodiment, extends over a part of its length coaxially to the longitudinal axis of the piston slide valve 49 and has a fluid-conducting deflection channel 54 which runs orthogonally to the longitudinal axis and is connected to the longitudinal channel 53.

An actuating device formed as rod for a switching flag 56 is designated with the reference number 55. The rod 55 is integrally and fixedly, but detachably connected to the adjusting piston 6, for example, through screw thread 57, and penetrates through the wall 4 sealed by a sealing element 58 and projects in each position of the adjusting piston 6 into the inner space 32 of the head part 1. By adjusting the adjusting piston 6 by screwing the piston rod part 16 more or less far into the internal thread 21 of the piston rod part 19, the correct adjustment of the switching flag 56 is carried out at the same time so that together with the adjustment of the pivoting angle of the toggle joint assembly 12 and the apparatus part associated therewith, for example, the tensioning arm 15 in the direction A or B, the sensor device is also correctly adjusted at the same. However, if necessary, the switching flag 34 can always be stationarily connected to the piston rod part 19. Since during adjustment of the pivoting angle of the piston-cylinder unit only the piston rod part 16 rotates in the one or the other direction, the adjusting piston 6 does not change its angular position with respect to the cylinder 3, specifically if the inner wall 10 has a noncircular, for example, rectangular, elliptical, square, or the like, shape. Thereby, the relative position of the switching flag 56 with respect to the sensor device 35 is maintained and does not need to be readjusted.

The mode of operation of the embodiment shown in the drawing is as follows:

In the position of the parts shown, for example, in FIG. 2, the transverse channel 40 is connected to a non-illustrated compressed air source which supplies the pressurized fluid, for example, compressed air. Thereby, the adjusting cylinder space 27 is filled with pressure of pressure medium, in particular with compressed air. At the same time, said pressure of the pressure medium transmits via the longitudinal channel 39 and the deflection channel 43 as well as the branch channel 54 in the piston slide valve 49 and the longitudinal channel 53 in piston slide valve 49 also into the annular cylinder space 28 and pressurizes the same also with pressure of the pressure medium, in particular with compressed air. Because the effective piston area in the annular cylinder space 28 is smaller than the pressure-effective area in the adjusting cylinder space 27, a differential force is generated which, in said actual position of the parts, acts in the Y-direction, thus towards the closed position, and thus pivots the tensioning arm 15 in the direction A.

Instead of a tensioning arm 15, other apparatus parts which are necessary, for example, during tensioning, pressing, joining, stamping, punching or welding can also be driven. During the no-load stroke, thus during the idle stroke, only a small driving force for overcoming frictional forces and, if necessary, weight resistances is required. Consequently, the driving energy required during the no-load stroke (idle stroke) is reduced in accordance with the pressure-effective areas in the drive unit, for example by approx. 70% or more. This can be determined through the selection of the pressure-effective piston areas, for example, in that the cross-section of the piston rod part 19 varies accordingly.

Once the annular piston 7 abuts against the front end of the piston slide valve 49 as a result of the further displacement of the adjusting piston 6 and the annular piston 7, the piston slide valve is displaced in its longitudinal axial direction in the wall 4 in the stroke direction of the annular piston 7 until it has reached the position shown in FIG. 3. In this position, the deflection channel 43 is closed off from the annular cylinder space 28 and is connected to the channel 46 in a fluid-conducting manner via the longitudinal channel 53 in the piston slide valve 49 and its branch 54, whereby the annular cylinder space 28 is connected to a return line or, respectively, is vented. Said return line or venting is needed again in the opposite stroke direction for the pressure supply of the pressure medium, in particular for the supply of compressed air.

During the idle stroke (no-load stroke) in the direction Y, the amount of fluid displaced by the annular piston 7 is delivered via the longitudinal channel 53 in the piston slide valve 49, the deflection channel 43, the longitudinal channel 39 and via the latter through the transverse channel 40 and, as the case may be, via the channel 41 to the adjusting cylinder space 27 so that during the no-load stroke, the amount of fluid displaced by the annular piston 7 does not get lost for driving, but only the difference has to be replaced for driving, which difference can vary depending on the setting of the adjusting piston 6 with respect to the annular piston 7 and thus depending on the length of thread engagement of the piston rod part 16 in the piston rod part 19.

Once the piston rod parts 16, 19 are being moved in the X-direction, the transverse channel 40 is pressurized via a non-illustrated control device for the fluid supply, in particular for the compressed air supply, with pressure medium pressure which, in the position of the parts according to FIG. 3, transmits via the longitudinal channel 39 and the channel 46 and via the longitudinal channel 53 into the annular cylinder space 28. Via the chamber channel 48, the pressure medium pressure transmits also below the piston 50 and into the chamber 45 and keeps the piston slide valve 49 in its position shown in FIG. 3. Thereby, the piston rod parts 16, 19 as well as the annular piston 7 and the adjusting piston 6 move in the X-direction and pivot the toggle joint assembly 12 in the direction B so that a tensioning arm 15 or the like coupled thereto moves also in the direction B, thus pivots into the open position. The pivoting angle in direction A or B of a tensioning arm can be, for example, from 0 to 135 degrees or more. The parts then move until the brake piston 22 enters the brake chamber 25 and the sealing element 26 thereby closes off the adjusting cylinder space 27. From then onwards, the fluid can only escape via a throttle borehole (not illustrated) into the channel 41 or 40 and can be recycled to the return line. Since the discharge of the pressure medium, for example compressed air, into the adjusting cylinder space 27 thereby is carried out in a delayed manner, hereby, a soft start or opening movement of the apparatus takes place so that a harsh abutting of the adjusting piston 6 against the bottom cover 5 is prevented.

If a movement of the parts in the direction Y is desired (no-load stroke, idle stroke), the fluid pressure, for example compressed air pressure, transmits again via the transverse channel 40 and the longitudinal channel 39 to the deflection channel 43 and also via channel section 44 and pressurizes the piston 50, whereupon the previously described work cycle can be repeated because then the piston slide valve 49 is displaced again from its position shown in FIG. 1 in the direction X until it is displaced again by the annular piston 7 from its control position shown in FIG. 3.

It is apparent that when actuating the piston slide valve 49, the full pressure medium pressure acts on the pressure-effective area of the adjusting piston 6. During the idle stroke, always only the pressure medium volume determined by the piston rod in the annular space is replaced by the pressure medium source, e.g., by a compressed air generator so that operating costs can be saved. Only a very small remaining amount of pressure medium, in particular compressed air, is vented. Thus, during the idle stroke of a toggle lever tensioning apparatus or the like, only the frictional forces to be overcome and, if applicable, inert forces have to be overcome. Therefore, the result is an average reduction of fluid, in particular of compressed air consumption, of at least 50 percent while maintaining the same technical performance data and dimensions. The apparatus according to the invention thus combines an energy-efficient drive that, at the same time, conserves the environment, and the possibility to continuously and in both directions change the stroke and thus the angle through which the parts driven via a toggle lever joint can be moved and to adjust it in the respectively desired position from outside and without disassembling the apparatus while, at the same time, adjusting the sampling device without the need to readjust the same during the adjustment of the pivoting angle.

The reference number 60 designates a transverse channel and the reference numbers 58 and 59 designate sealing elements for the pressure-medium-tight passage of the rod 55. 61 is a connector through which the data sampled by the sensor device 35 can be transmitted to a remote data collection point.

The features described in the abstract, in the patent claims and in the description and the features illustrated in the drawing can be essential individually as well as in any combination for the implementation of the invention.

REFERENCE NUMBER LIST

1 Tensioning head, head unit
2 Drive unit
3 Cylinder
4 Wall
5 Bottom cover
6 Adjusting piston
7 Annular piston
8 Sealing element
9 Sealing element
10 Inner wall
11 Center line
12 Toggle joint assembly
13 Joint
14 Axle, fixed in the housing
15 Apparatus part, tensioning arm, centering mandrel, welding jaw, clinching tool
16 Piston rod part
17 Thread
18 Sealing element
19 Piston rod part
20 Blind borehole
21 Internal thread
22 Brake piston
23 Recess
24 Opening
25 Brake chamber
26 Sealing element
27 Adjusting cylinder space
28 Annular cylinder space
29 Cylinder space
30 Longitudinal channel
31 Borehole
32 Inner space
33 Sealing element
34 Switching flag
35 Sensor device
36 Component
37 Microswitch
38 Microswitch
39 Longitudinal channel
40 Transverse channel
41 Channel
42 Sealing plug
43 Deflection channel
44 Channel section
45 Chamber
46 Channel
47 Borehole, cylindrical
48 Chamber channel
49 Piston slide valve, control device
50 Piston
51 Cylinder space
52 Cylinder space
53 Longitudinal channel
54 Branch channel
55 Rod, actuating part
56 Switching flag
57 Screw thread
58 Sealing element
59 Sealing element
60 Transverse channel
61 Connector
X Lifting device
Y Lifting device
A Pivot direction
B Pivot direction

The invention claimed is:

1. An energy-efficient apparatus driven by compressed air and equipped with dual piston function for tensioning, or for clamping, or for centering, or for punching, or for welding, or for clinching, for use in body construction in the automotive industry, comprising a drive unit configured as piston-cylinder unit to which the compressed air can be supplied and a head unit coaxially adjacent thereto, in which head unit a toggle joint assembly is arranged in a pivotably movable manner on a stationary axle mounted in the head unit, wherein the toggle joint assembly is connected to a multi-part, longitudinally adjustable piston rod which can also be locked in the desired position and extends in the axial direction of the drive unit, and an annular piston and an adjusting piston are guided axially spaced apart from each other in the cylinder of the drive unit in a longitudinally movable and sealed manner under the effect of the compressed air, and the annular piston is connected by a piston rod part via a joint to the toggle joint assembly and is movable in an articulated manner, and the adjusting piston is coupled with a second piston rod part, and that in each stroke position and in each setting of the annular piston and the adjusting piston relative to each other, the cylinder space which is arranged between the annular piston and the adjusting piston and which increases or decreases depending on the setting of the annular piston and the adjusting piston relative to each other, is closed off from the compressed air, and that the annular piston controls and guides during an idle stroke (no-load stroke) the amount of compressed air displaced by the annular piston via a control device and via a channel system into the adjusting cylinder space of the pressure-effective piston area of the adjusting piston, and the remaining amount of compressed air from the annular cylinder space displaced by the annular piston is only connected via a channel to a return line after finishing the no-load stroke and by actuating the control valve, wherein upon or shortly after actuating the control device, the full air pressure pressurizes the pressure-effective area of the adjusting piston and effects the force stroke, and wherein the cylinder space located between the adjusting piston and the annular piston is vented through a longitudinal channel running in the piston rod or a piston rod part and opening out at an end via a borehole into an inner space of the head part.

2. The apparatus according to claim 1, characterized in that the annular piston controls a piston slide valve and channels arranged therein conveying compressed air and their connections to channels arranged in the walls of the apparatus for connecting to the compressed air supply and compressed air discharge as well as for redirecting to the adjusting cylinder space of the adjusting piston having the pressure-effective area.

3. The apparatus according to claim 2, characterized in that the piston slide valve is arranged in a wall which separates the annular cylinder space of the annular piston from an inner space of the head part, wherein the toggle joint assembly is arranged encapsulated on all sides from the outside against contaminations in the inner space of the head part.

4. The apparatus according to claim 1, characterized in that the apparatus is associated with sensor device formed as cartridge which is arranged through an opening preferably on the backside of the head part and closes the opening from the outside with joints as tight as possible and sealed against contamination, wherein the apparatus comprises fastening means, in particular blind boreholes having a thread, on all four sides so that the apparatus can be replaceably fastened not only from the backside, but, if necessary, also from the remaining three other sides.

5. The apparatus according to claim 1, characterized in that the piston rod part is formed as adjustment screw having a thread for adjusting the pivoting angle of the toggle joint assembly.

6. The apparatus according to claim 1, characterized in that the one piston rod part connected to the toggle joint assembly and the annular piston has a blind borehole provided with an internal thread in which the other piston rod part connected to the adjusting piston can be adjusted via external thread from the outside through the bottom cover of the drive unit and can also be locked in the respectively desired position.

7. The apparatus according to claim 1, characterized in that the piston rod part provided with the adjusting piston is provided with a blind borehole having a thread into which the annular piston can be screwed via a thread with a piston rod part formed as threaded bolt and can be adjusted through the bottom cover of the drive unit.

8. The apparatus according to claim 1, characterized in that on its side facing away from the head part, the adjusting piston is associated with a brake piston which engages in the open position in a sealed manner with a brake chamber of the bottom.

9. The apparatus according to claim 1, characterized in that a closable opening is provided in the bottom cover of the drive unit through which opening the piston rod parts are longitudinally adjustable by means of a tool.

10. The apparatus according to claim 1, characterized in that the adjusting cylinder space located between the adjusting piston and the bottom cover is connected via a throttle channel to the fluid supply and fluid discharge and to the channel system to the annular cylinder space as well as to a brake chamber in the bottom cover.

11. The energy-efficient apparatus driven by compressed air and equipped with dual piston function for tensioning, or for clamping, or for centering, or for punching, or for welding, or for clinching, for use in body construction in the automotive industry, comprising a drive unit configured as piston-cylinder unit to which the compressed air can be supplied and a head unit coaxially adjacent thereto, in which head unit a toggle joint assembly is arranged in a pivotably movable manner on a stationary axle mounted in the head unit, wherein the toggle joint assembly is connected to a multipart, longitudinally adjustable piston rod which can also be locked in the desired position and extends in the axial direction of the drive unit, and an annular piston and an adjusting piston are guided axially spaced apart from each other in the cylinder of the drive unit in a longitudinally movable and sealed manner under the effect of the compressed air, and the annular piston is connected by a piston rod part via a joint to the toggle joint assembly and is movable in an articulated manner, and the adjusting piston is coupled with a second piston rod part, and that in each stroke position and in each setting of the annular piston and the adjusting piston relative to each other, the cylinder space which is arranged between the annular piston and the adjusting piston and which increases or decreases depending on the setting of the annular piston and the adjusting piston relative to each other, is closed off from the compressed air, and that the annular piston controls and guides during the no-load stroke the amount of compressed air displaced by the annular piston via a control device and via a channel system into the adjusting cylinder space of the pressure-effective piston area of the adjusting piston and the remaining amount of compressed air from the annular cylinder space displaced by the annular piston is only connected via a channel to a return line after finishing the no-load stroke and by actuating the control valve, wherein upon or shortly after actuating the control device, the full air pressure pressurizes the pressure-effective area of the adjusting piston and effects the force stroke, wherein a sensor device selected from the group consisting of an inductive switch, a limit switch, a microswitch and a pneumatic switch is provided which detects the open and the working position, and by the adjusting piston together with the adjustment of the pivoting angle of the toggle joint assembly can be adjusted, while a second switching flag is connected to the piston rod part which is associated with the toggle joint assembly.

12. The apparatus according to claim 11, characterized in that the adjusting piston is connected to an actuating part which has a switching flag at its end.

13. The apparatus according to claim 12, characterized in that the actuating part is formed as rod which sealingly penetrates the annular piston and the wall which separates the inner space of the head part.

14. The apparatus according to claim 11, characterized in that the annular piston controls a piston slide valve and channels arranged therein conveying compressed air and their connections to channels arranged in the walls of the apparatus for connecting to the compressed air supply and compressed air discharge as well as for redirecting to the adjusting cylinder space of the adjusting piston having the pressure-effective area.

15. The apparatus according to claim 14, characterized in that the piston slide valve is arranged in a wall which separates the annular cylinder space of the annular piston from an inner space of the head part, for example, the tensioning head of a toggle lever tensioning apparatus in a pressure-medium-tight manner, wherein also in this inner space, the toggle joint assembly is preferably arranged encapsulated on all sides from the outside against contaminations.

16. The apparatus according to claim 11, characterized in that the apparatus is associated with sensor device formed as cartridge which is arranged through an opening preferably on the backside of the head part and closes the opening from the outside with joints as tight as possible and sealed against contamination, wherein the apparatus comprises fastening means, in particular blind boreholes having a thread, on all four sides so that the apparatus can be replaceably fastened not only from the backside, but, if necessary, also from the remaining three other sides.

17. The apparatus according to claim 11, characterized in that the piston rod part is formed as adjustment screw having a thread for adjusting the pivoting angle of the toggle joint assembly.

18. The apparatus according to claim 11, characterized in that the one piston rod part connected to the toggle joint assembly and the annular piston has a blind borehole provided with an internal thread in which the other piston rod part connected to the adjusting piston can be adjusted via external thread from the outside through the bottom cover of the drive unit and can also be locked in the respectively desired position.

19. The apparatus according to claim 11, characterized in that the piston rod part provided with the adjusting piston is provided with a blind borehole having a thread into which the annular piston can be screwed via a thread with a piston rod part formed as threaded bolt and can be adjusted through the bottom cover of the drive unit.

20. The apparatus according to claim 11, characterized in that on its side facing away from the head part, the adjusting piston is associated with a brake piston which engages in the open position in a sealed manner with a brake chamber of the bottom.

21. The apparatus according to claim 11, characterized in that a closable opening is provided in the bottom cover of the drive unit through which opening the piston rod parts are longitudinally adjustable by means of a tool.

22. The apparatus according to claim 11, characterized in that the cylinder space located between the adjusting piston and the annular piston is vented through a longitudinal channel running in the piston rod or a piston rod part and opening out at an end via a borehole into the inner space of the head part.

23. The apparatus according to claim 11, characterized in that the adjusting cylinder space located between the adjusting piston and the bottom cover is connected via a throttle channel to the fluid supply and fluid discharge and to the channel system to the annular cylinder space as well as to a brake chamber in the bottom cover.

\* \* \* \* \*